United States Patent
Marmet et al.

(10) Patent No.: US 10,317,537 B2
(45) Date of Patent: Jun. 11, 2019

(54) RECOVERY ASSISTANCE DEVICE, METHOD AND SYSTEM

(71) Applicant: CENTRE NATIONAL D'ETUDES SPATIALES, Paris (FR)

(72) Inventors: Francois-Xavier Marmet, Muret (FR); Lionel Ries, Viviers les Montagnes (FR); Jacques Beas-Garcia, Toulouse (FR); Gaël Scot, Toulouse (FR); Marion Aubault, Balma (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 285 days.

(21) Appl. No.: 15/373,651

(22) Filed: Dec. 9, 2016

(65) Prior Publication Data
US 2017/0184725 A1  Jun. 29, 2017

(30) Foreign Application Priority Data
Dec. 23, 2015 (EP) .................................. 15307136

(51) Int. Cl.
| | |
|---|---|
| *H04W 24/00* | (2009.01) |
| *G01S 19/26* | (2010.01) |
| *G01S 19/17* | (2010.01) |
| *A63B 29/02* | (2006.01) |
| *G01S 19/49* | (2010.01) |

(Continued)

(52) U.S. Cl.
CPC ............ *G01S 19/26* (2013.01); *A63B 29/021* (2013.01); *G01S 5/0284* (2013.01); *G01S 5/18* (2013.01);

(Continued)

(58) Field of Classification Search
USPC ....... 455/456.1, 456.5, 386, 404.1; 370/328; 342/357.64
See application file for complete search history.

(56) References Cited

U.S. PATENT DOCUMENTS

| | | | |
|---|---|---|---|
| 6,483,461 B1 | 11/2002 | Matheney et al. | |
| 7,502,619 B1 * | 3/2009 | Katz | G01S 5/02 455/456.5 |

(Continued)

FOREIGN PATENT DOCUMENTS

| | | | |
|---|---|---|---|
| EP | 2357494 A1 * | 8/2011 | ............. G01S 19/48 |
| WO | 2016008991 A1 | 1/2012 | |

OTHER PUBLICATIONS

Bataller et al. "Modeling of Through-the-Snow Electric Field Propagation for Rescue Systems", Excerpt, COMSOL conference in Stuttgart, 2011.

(Continued)

*Primary Examiner* — David Q Nguyen
(74) *Attorney, Agent, or Firm* — Burris Law, PLLC

(57) ABSTRACT

The invention discloses a recovery assistance device for helping in rescuing victims of avalanches, earthquakes or boat capsizes. The device is capable of calculating a position from combinations of a previous position and distances to other devices. Different configurations are possible, with a basic configuration consisting of a smart phone having waveform generation capabilities, processing and GNSS receiving capabilities. The device is programmed to be used in a defined mission by an application. The device can also receive a number of add-ons as a battery add-on, a modem add-on, a sound wave generation add-on, antennas, and protection, possibly waterproof, if adequate. Devices of the same type can be carried by people to be rescued and rescuers. The device is therefore quite versatile and can increase significantly the efficiency of rescue teams in different use case scenarios.

15 Claims, 6 Drawing Sheets

(51) Int. Cl.
  *G01S 19/51*  (2010.01)
  *G01S 5/02*  (2010.01)
  *G01S 5/18*  (2006.01)
  *G01S 5/30*  (2006.01)
  *H04W 4/80*  (2018.01)
(52) U.S. Cl.
  CPC ............... *G01S 5/30* (2013.01); *G01S 19/17* (2013.01); *G01S 19/49* (2013.01); *G01S 19/51* (2013.01); *H04W 4/80* (2018.02)

(56) References Cited

U.S. PATENT DOCUMENTS

| | | | |
|---|---|---|---|
| 2005/0270234 A1 | 12/2005 | Wolf et al. | |
| 2006/0128354 A1* | 6/2006 | Carle | A62B 33/00 455/404.1 |
| 2008/0225779 A1* | 9/2008 | Bragiel | G01S 5/0252 370/328 |
| 2010/0149030 A1* | 6/2010 | Verma | G08B 13/1436 342/357.64 |
| 2013/0278416 A1 | 10/2013 | Button et al. | |
| 2014/0288822 A1* | 9/2014 | Morrison | G01S 19/23 701/466 |
| 2015/0015441 A1* | 1/2015 | Chiou | G01S 1/02 342/386 |
| 2015/0087331 A1* | 3/2015 | Yang | G01S 5/02 455/456.1 |

OTHER PUBLICATIONS

European Search Report for 15307136.0, dated Jun. 30, 2016.

\* cited by examiner

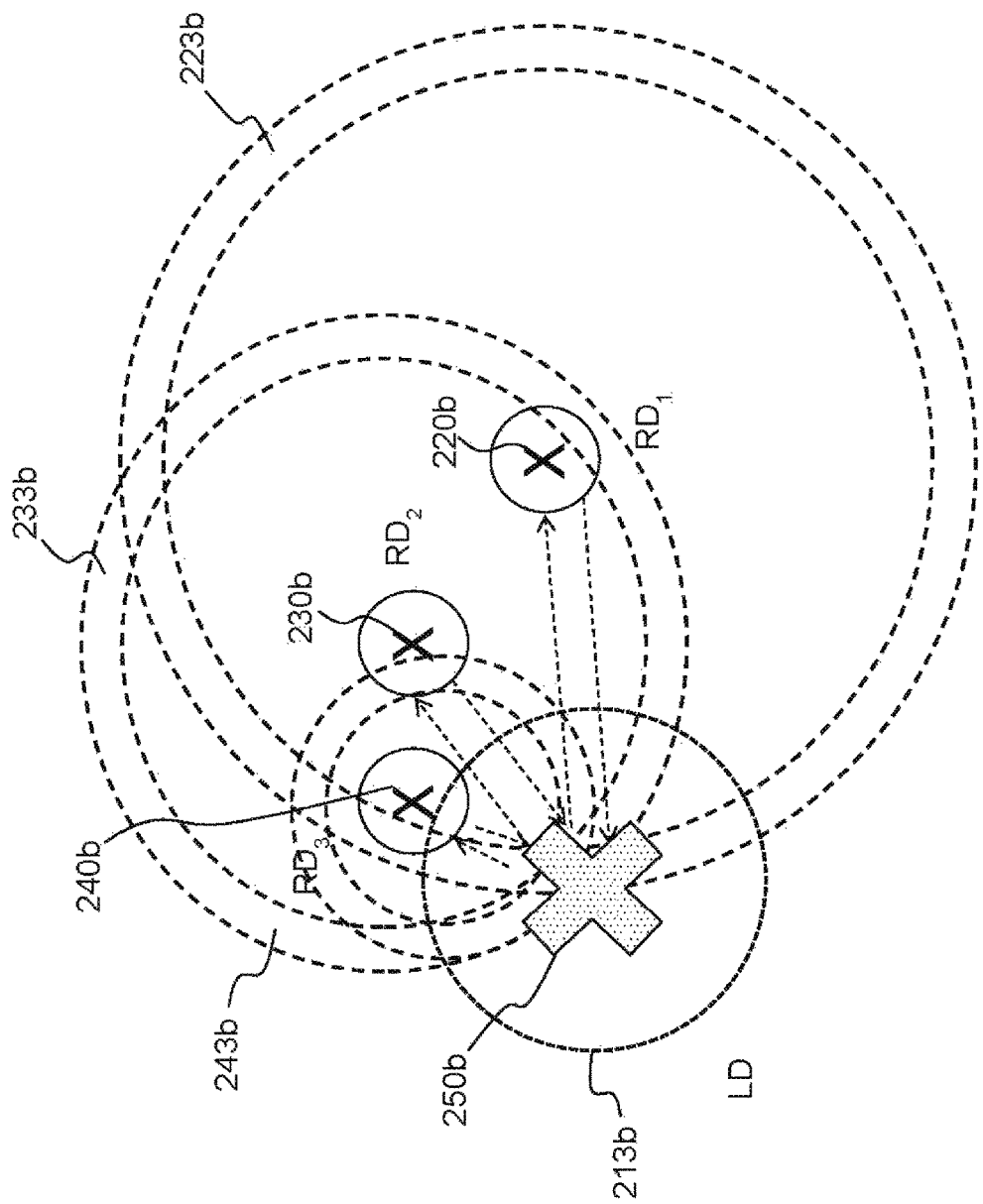

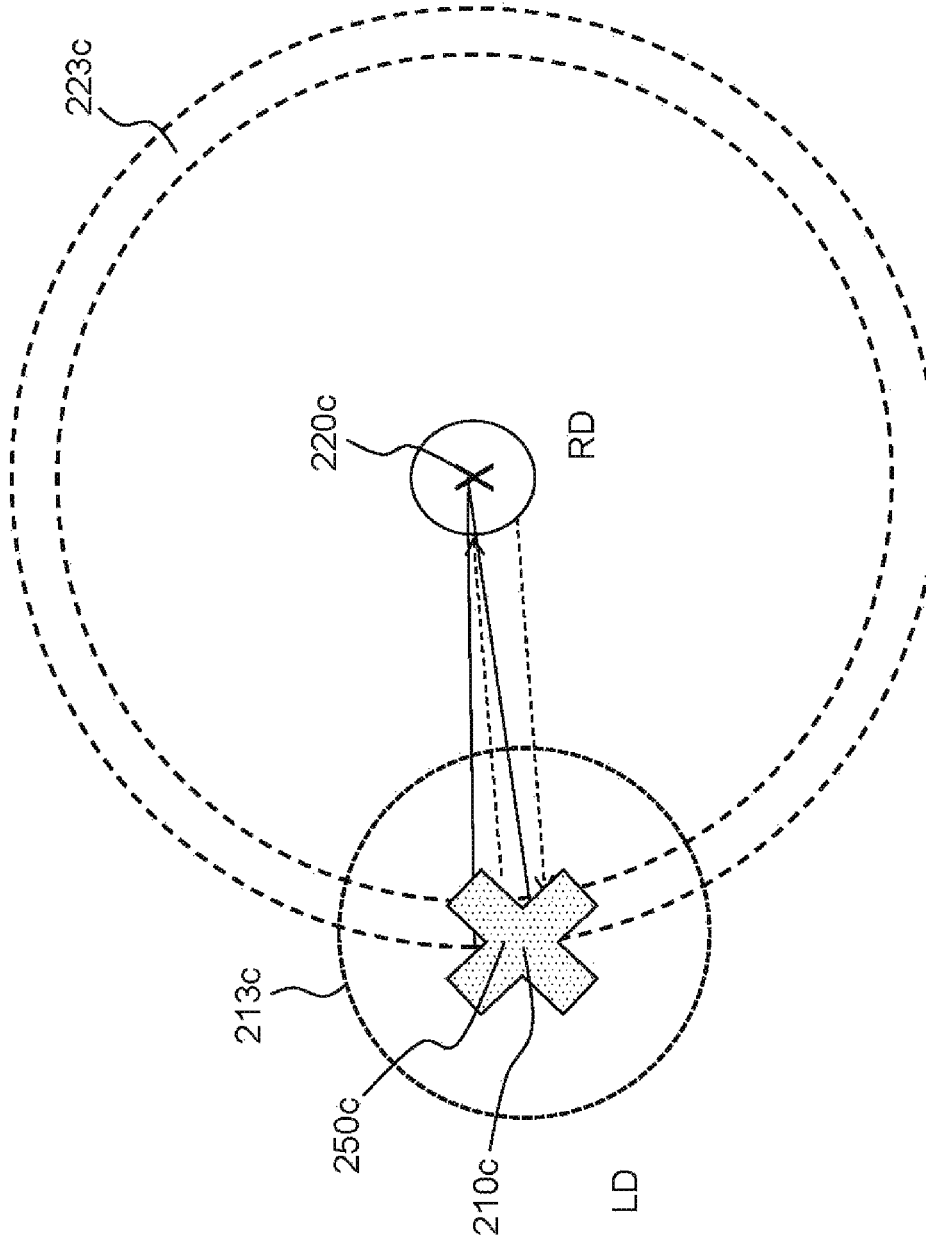

RECOVERY ASSISTANCE DEVICE, METHOD AND SYSTEM

FIELD OF THE INVENTION

The invention relates to a device, method and system for detecting and locating people, animal or object/element. More specifically, the invention is applicable to the rescue of people buried under snow avalanches, trapped under rubble as a result of an earthquake or a tsunami, or lost after a boat capsize.

BACKGROUND

As a first background example, every year a number of people die victim of snow avalanches. The probability of survival for a snow buried victim is tightly related to the time spent for finding him or her.

In the state of the art, there are essentially two devices used to locate victims of avalanches: the ARB (Avalanche Rescue Beacon) and the RECCO system.

An ARB (Avalanche Rescue Beacon) system, or ARVA (Appareil de Recherche de Victimes d'Avalanches) or DVA (Detecteur de Victimes d'Avalanche) consists in a radiofrequency transmitter-receiver using a radio-frequency wave at 457 kHz. In emitting mode, the person wearing the device can be located. The same device is used in the receptor mode to locate the snow buried victim by rescuers or any person participating in the search.

The RECCO™ system is based on harmonic radar and transmits at around 1.8 GHz. This system is divided in two parts. The rescue teams are equipped with RECCO transmitters that emit a directional signal. The RECCO reflector worn by the potential victims reflects the signal and returns it to the receiver/transmitter.

Both ARVA and RECCO systems emit a signal and the localization is achieved, based on the power signal. Each device requires a specific training and learning of search techniques (dichotomy or triangulation methods). And more, they are technically limited in range and accuracy, so they require time and a large rescue team for finding the victim.

Another system is also known under the name SICRA (SICRA: a GNSS cooperative system for avalanche rescue, IEEE 2012), a GNSS cooperative system for avalanche rescue. This system integrates the GNSS navigation technologies, the cooperative networks and a control system for planning the actions of the rescue team. By acquiring the position of each element in the system, the system generates the relative distance in the snow between the buried victim and the rescuers and gives the direction that the rescuer has to follow for finding the victim. The system uses GPS positioning only which results in a reduced accuracy of the victim location. In addition, the system does not work in case of loss of the GPS signal for one reason or another.

Another system is based only on HSGPS (High Sensitivity Global Positioning System) (GPS tracking performance under avalanche deposited snow, 2006) receivers to locate avalanche victims at snow depths of two meters and beyond. This system tracks weaker GPS signals through avalanche snow. The GPS signal from the satellite to the receiver buried under the avalanche snow, may take a number of different paths depending on refraction and scattering when the signal encounters the snow. Thus, multipath reflections reduce the position accuracy and the precision of victim's localization, and so this system is still not adequate to quickly identify the position of the person completely trapped under snow avalanches.

Other examples of situations wherein the same difficulties to locate persons, animals or objects are: earthquakes, inundations, including tsunamis, boat accidents and losses of divers. Some of the same systems of the prior art may be used occasionally for trying to locate the victims, notably GNSS receivers. But they are still useful to a lesser extent, since these victims are seldom pre-equipped with a specific device. Also, in the water or under significant amount of displaced boulders, these techniques will seldom work.

Therefore, the systems and methods of the prior art have significant limitations in view of the problems which are encountered. There is thus a need for new techniques or methods to find a victim in a limited time with a better accuracy.

The present invention discloses a solution to overcome the previously cited drawbacks.

SUMMARY OF THE INVENTION

A purpose of the present invention is to meet this need. To this effect, the invention discloses notably a device to be worn by persons, animals or objects likely to be in a situation needing recovery and which is configured to one or more of emit and receive carrier signals of different waveforms. An identical device can also be used by persons likely to be in a situation to assist in the recovery.

To this effect, this invention discloses a recovery assistance device comprising: a signal processing unit of a type defined to perform one or more of transmit or receive a carrier signal of a waveform and a frequency band selected to allow measurement of propagation distances to other signal processing units of the type through a material in a non-gaseous state; a logical unit configured to combine a first propagation distance between the signal processing unit and a first another signal processing unit with a position of one of the signal processing unit or the first another signal processing unit to determine a first area of recovery of one of the signal processing unit or a first another signal processing unit; a logical unit further configured to calculate a position of said recovery assistance device from one or more combinations of an absolute position of another recovery assistance device and a distance between said recovery assistance device and said another recovery assistance device.

Advantageously, the logical unit receives the position of the one of the signal processing unit or the first another signal processing unit from one of a position calculation unit which is co-localized with said one of the signal processing unit or another position calculation unit which is co-localized with the first another signal processing unit.

Advantageously, the position calculation unit comprises a GNSS receiver.

Advantageously, the position calculation unit further comprises motion sensors.

Advantageously, the position calculation unit and the logical unit are configured to calculate a current position of said device from a previous position determined by the GNSS receiver at a confidence threshold and motion sensors measurements from this previous position up to the current position where motion is determined to be null.

Advantageously, the position calculation unit is configured to determine a position of the one of the signal processing unit or the first another signal processing unit at a precision of or better than 50 cm.

Advantageously, at least one of the signal processing unit or the first another signal processing unit is configured to determine an angle of arrival of the carrier signal.

Advantageously, the logical unit is further configured to determine a second area of recovery of one of the signal processing unit or a first another signal processing unit from a combination of one of a second position of the same first another processing signal unit or a position of a second another signal processing unit, and a second propagation distance between said one of the signal processing unit or said second position of the same first another processing signal unit or said position of a second another signal processing unit.

Advantageously, the logical unit is further configured to combine the first area of recovery and the second area of recovery to determine points of likely recovery of the one of the signal processing unit or a first another signal processing unit at intersections of the first area of recovery and the second area of recovery.

Advantageously, the logical unit is further configured to disambiguate the points of likely recovery by having the one of the signal processing unit or a first another signal processing unit, and the second another signal processing unit being caused to locate themselves at predefined locations.

Advantageously, the logical unit is further configured to transmit its calculated position to one or more another recovery assistance devices.

Advantageously, the material in a non-gaseous state comprises one or more of snow, rocks or construction materials and the signal processing unit is configured to one or more of transmit or receive one or more of WI-Fi or Bluetooth carrier signals.

Advantageously, the signal processing unit is further configured to one or more of receive or transmit one or more of Wi-Fi or Bluetooth signals modulated by a code configured to calculate one or more of a time of arrival, an angle of arrival or a signal strength of the signals.

Advantageously, the material in a non-gaseous state comprises water and the signal processing unit is configured to one or more of transmit or receive acoustic wave carrier signals.

Advantageously, the recovery assistance device of the invention further comprises an add-on sonar transducer and signal processing module.

Advantageously, the recovery assistance device of the invention further comprises a modem configured to one or more of modulate or demodulate the carrier signal of the waveform with a code selected to optimize measurement of one or more of time of arrival, angle of arrival and signal strength or transmission of information through the material in the non-gaseous state.

Advantageously, the signal processing unit is further configured to be caused by the logical unit to transmit a message on the carrier signal, the message comprising one or more of an identification of said recovery assistance device or a condition of a user of said recovery assistance device gathered by a biological sensor.

The invention also discloses a recovery assistance method comprising: one or more of transmitting or receiving at a signal processing unit a type of carrier signal of a waveform and a frequency band selected to allow measurement of propagation distances to other signal processing units of the type through a material in a non-gaseous state; combining a first propagation distance between the signal processing unit and a first another signal processing unit with a position of one of the signal processing unit or the first another signal processing unit to determine a first area of recovery of one of the signal processing unit or a first another signal processing unit; the combining comprising calculating a position of said signal processing unit from one or more combinations of an absolute position of the first another signal processing unit and a distance between said signal processing unit and said first another signal processing unit.

The invention also presents the advantage to considerably increase the accuracy of the victim's localisation, allowing saving precious minutes in the rescue. The invention also provides a solution that is easy to implement and does not require any specific training to use it. It is also quite versatile and may be used in different situations, with some hardware or software add-ons to the basic device. The basic device may be a simple smart phone.

Also, with prior art techniques, a local approach by rescuers carrying devices which are not coordinated may work well for the final approach but can be erroneous when starting the search, due, for instance, to boulders and other terrain obstacles. With a global approach by rescuers carrying devices which cooperate, positions of several rescuers (search and rescue) are referenced in the same GNSS referential. The invention uses absolute positioning and thus allows combining information coming from two of more rescuers. In addition, a victim is also in the same referential. The invention also allows the addition of topographical and terrain or other information to the GNSS positioning information, which allows mitigating multipath and medium effects thus narrowing progressively the area of recovery.

Also, the invention facilitates the correct localization of multiple victims. Having a common referential contributes to a differentiation of victims, even if they return identical or close signal information. On the field, a rescuer may receive conflicting information (e.g. two locations for the same victim). By combining this information with information received by another rescuer, or the same rescuer at another location, the two different locations may be confirmed. By combining this information to a third position, the second location may also be confirmed. This process may of course be refined in the case of more than two victims.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which:

FIGS. 2a, 2b and 2c represent operational scenarios of using the recovery assistance device of the invention according to a number of its embodiments;

DETAILED DESCRIPTION

Figure 1A:
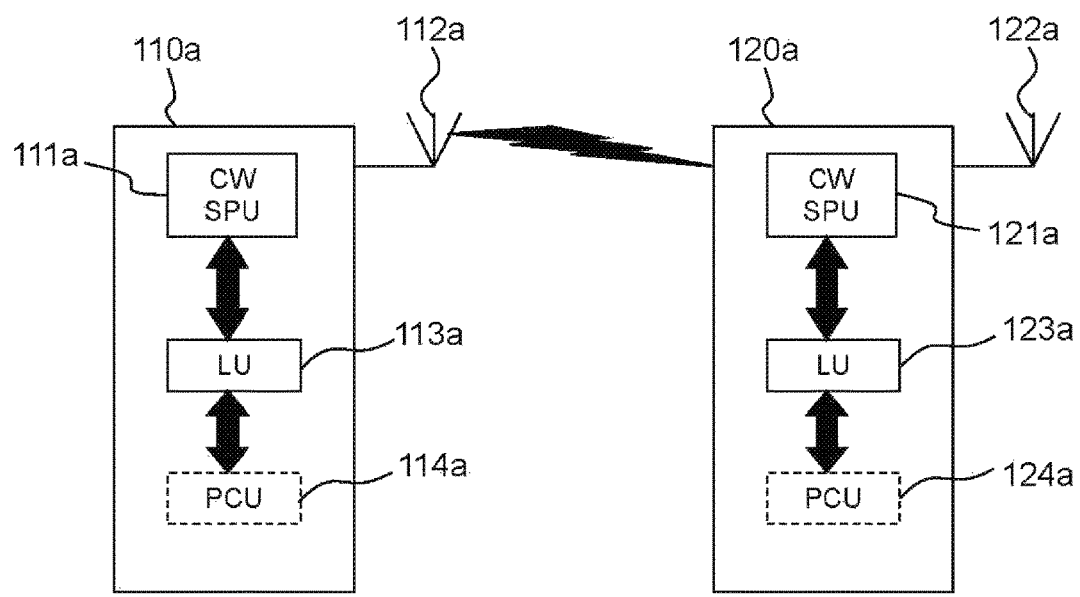
FIGS. 1a, 1b and 1c represent schematic views of functional architectures of recovery assistance devices, in a number of embodiments of the invention.
Figure 1B:
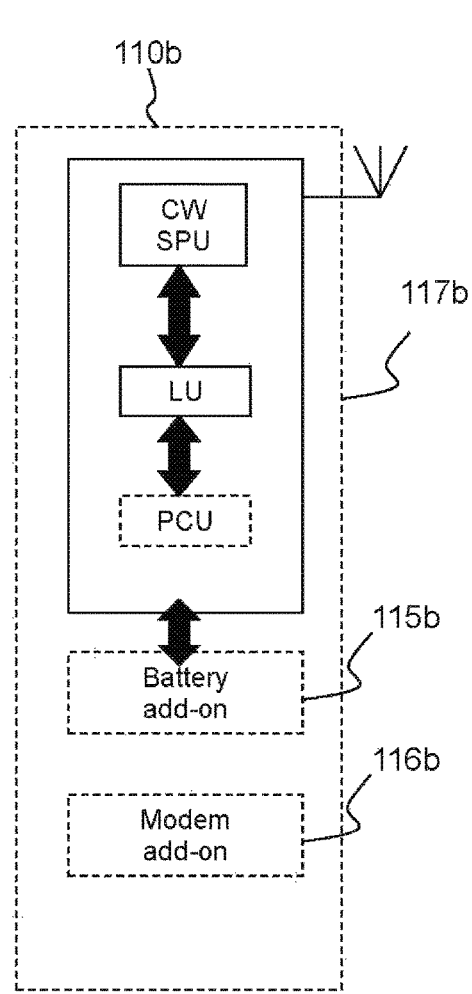
Figure 1C:
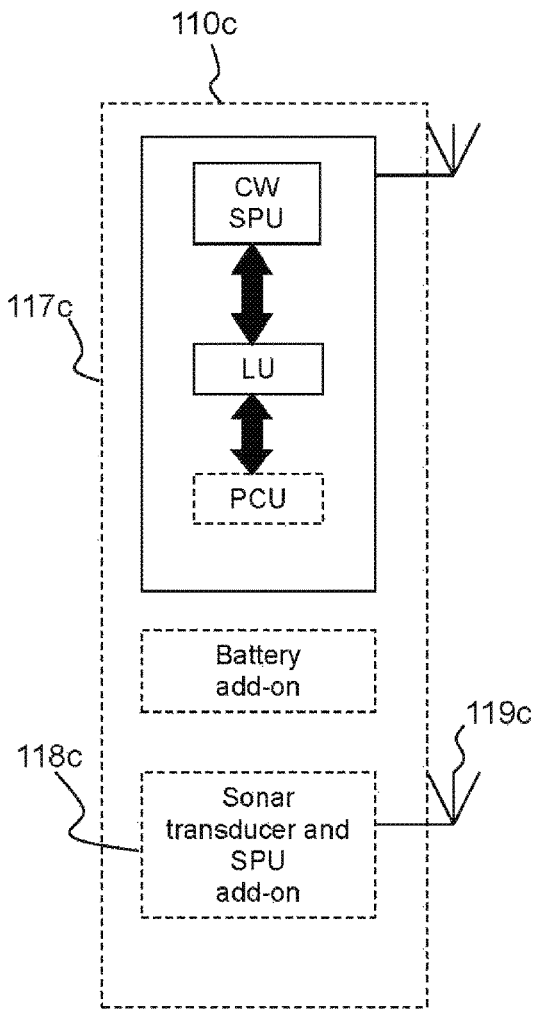

FIGS. 1a, 1b and 1c represent schematic views of functional architectures of recovery assistance devices, according to some embodiments of the invention.

As illustrated on FIG. 1a, the invention is implemented using two carrier wave transmit/receive (T/R) devices, 110a, 120a. The devices may be identical or may be different. They have to be capable of communicating with one another, using a predetermined carrier wave. To this effect, they have, in particular, adequate antennas 112a, 122a. They also have carrier wave signal processing units, 111a, 121a.

The devices may use RF carrier waves or other types of carrier waves, for instance acoustic waves.

For use cases where the recovery assistance device will probably be used either under a snow avalanche or under rubble, the proper carrier wave may be RF. The frequency band commonly used by avalanche beacons is 457 kHz, as normalized by ETSI, or 869.8 MHz for a W-Link transmission used to transmit vital signals information. But other bands may be adequate, for instance the ISM, 433 MHz, 2.45 GHz and 5.2 GHz bands. Of course, path loss is proportional to the square of the frequency of the carrier wave signal. It is therefore more advantageous to use the lower frequency bands, with the caveat that 2.45 GHz, WiFi and Bluetooth T/R devices are commonly available to the general public. Improvements in Bluetooth technology now offers increased throughput, longer range and better latency, without additional draw on power.

Also, path loss depends on the media traversed. Experimental results and modelling show an additional attenuation in snow of about 3 dBm at 433 MHz and 5 dBm at 2.45 GHz. See for instance "Modeling of Through-the-Snow Electric Field Propagation for Rescue Systems", Bataller et alii, University of Zaragoza. In addition to path loss, other causes of defects in transmission have to be taken into account to extrapolate signal strength at a receiver, such as multipath, diffraction or diffusion. All these factors will have to be taken into account when designing a specific T/R module (CW SPU, 111a, and antenna, 112a). In particular, a high gain directional antenna may compensate for signal attenuation in a direction.

Also, more than one antenna 112a, 122a may be desirable, notably if Angle of Arrival (AoA) of the carrier wave is to be determined in addition to Time of Arrival (ToA) or Time of Flight (ToF), which can be done with standard T/R configurations with single simple antenna.

Advantageously, the waveform and/or modulation of the carrier signal will be selected to minimize attenuation and/or multipath reflections in snow or under rubble. Indeed, the way of transmitting data can be more or less robust to the potential errors brought by the environment around the receiver.

An important design consideration will also be the electric power needed to operate the T/R module, which may impact on the selection of the carrier wave, the modulation, and the information transmitted thereon. For instance, if the device of the invention is configured as a recovery device for snow avalanche victims, since it is well known that recovery must occur in the first one or two quarters of an hour, the device may be configured to operate in a transmit mode at a relatively high power to maximize the odds that the signal is received, at the expense of a shorter life time of the battery. Contrary to this situation, earthquake victims may be rescued a number of hours or even days after having been buried. In this case, a low power consumption mode will be preferred, and the T/R module will be configured to operate most often in a receive mode, so that the battery life time may be preserved.

All in all, according to the invention, it is advantageous to be able to use a standard device, for example a smart phone, and a standard carrier wave, for example a Wi-Fi signal. A software application will then be used to program a Logical Unit (LU), 113a, 123a, which can be part of the general purpose processor of the smart phone, to operate the smart phone as a recovery assistance device, as will be explained further down in the description. The LU should be configured to perform ToA, and optionally AoA and/or Signal Strength (SS) calculations. It may also be configured to drive the CW SPU to modulate or demodulate the CW recovery assistance signals. The modem functions may be performed by a dedicated hardware add-on module. The recovery assistance device may also be a specific, dedicated hardware, comprising a CW SPU operating in a specific frequency band, a specific Logical Unit and, possibly, and an add-on modem as explained further down in the description.

Advantageously, a recovery assistance device 110a according to the invention is carried by a person who is a victim to be rescued and another recovery assistance device according to the invention 120a is carried by a person who is a potential rescuer of the victim to be rescued. Since it is difficult to have advanced knowledge of who will be a victim and who will be a rescuer in a group of skiers, it is very advantageous that all recovery assistance devices be identical, or at least be able to operate in any of the two modes, i.e. rescue or rescued modes. Device 120a, according to the invention, may also be carried by a flying carrier, such as a helicopter or a drone.

Both devices 110a and 120a may have an operative Position Calculation Unit (PCU) 114a, 124a. A PCU may be a GNSS receiver capable of receiving navigation messages from one or more GNSS satellites constellations, such as the GPS™, Beidou™, Glonass™ or Galileo™ constellations. A GNSS receiver acquires and tracks carrier waves signals transmitted by the GNSS satellites in the L Band. A satellite is identified by the receiver through correlation of the received signals with replicas generated in the receiver. The position of the satellite being known at a given time, a pseudo-range of the link between the satellite and the receiver is calculated. From a minimum of four different pseudo-ranges, it is possible to calculate a Position, Velocity, Time (PVT) of the receiver. A GNSS time reference is very precise and is often used as a timestamp, or to synchronize other signals.

A problem with GNSSs is that the SNR of the navigation signals is quite low. These signals are also very much affected by multipath reflections. Reception of GNSS signals cannot therefore be guaranteed under a snow avalanche or rubble resulting from an earthquake.

A solution of a first type to this problem is to use some motion sensors which may be included in the PCU 114a. The motion sensors may include an accelerometer, a gyroscope and/or a magnetometer. These will provide 9 DOF (Degrees Of Freedom) measurements and are available in MEMS technology at a low cost. They are indeed available on smart phones. The motion sensors may also be only one of those, or two out of the three categories. This will deliver measurements with fewer degrees of freedom. The LU 113a may be configured to calculate a position derived from the last GNSS PVT calculated with a confidence interval higher than a determined level, or the last GNSS calculated from navigation signals having an SNR (Signal to Noise Ratio) or a C/NO (Carrier to Noise at the centre of the bandwidth of the carrier wave) higher than a determined level. This will be probably the last position calculated before the victim is buried under snow or boulders. The LU is then able to calculate an estimated position of the device 110a by adding the path measured by the motion sensors to the last quality position saved in a memory of the LU.

Then the position calculated by the LU may be broadcast by the T/R module to the T/R modules of the rescue team, or published on an address of the device to be rescued 110a, with its identification. The rescue device(s) 120a can then receive the estimated position of the device to be recovered 110a, which may be displayed on a screen of the device, with a confidence circle, and the rescuers can then act accordingly.

A solution of a second type is to have the device to be recovered calculate its position relative to the rescue devices 120a present in the rescue area from ToA (and possibly AoA and SS) of the carrier wave signals transmitted by said rescue devices. Advantageously, the carrier signal will be modulated by a code allowing a calculation of a pseudo-range between each of the rescuing devices and the device to be recovered. The rescuing devices and the device to be recovered will form a wireless network, using either one of the standardized protocols, such as 802.11x. Any kind of TDMA (Time Division Multiple Access) protocol may be used, including proprietary protocols. But it is in any case necessary that the devices can respectively identify themselves to make sure that the distance calculations are proper.

The device to be recovered transmits its position relative to the rescuing devices to the rescuing devices and it is sufficient that three of the rescue devices 120a know their own GNSS positions to determine, at each of the rescuing devices LU, the absolute position of the device 110a to be recovered from these GNSS positions and the information on the relative position transmitted by the device 110. When AoA is used, one rescuing device is enough.

A solution of a third type is to have the rescuing devices 120a according to the invention transmit their own GNSS PVTs to the device to be recovered 110a. Then, the latter device can compute its own position triangulated from at least three among the GNSS instant positions and ToA calculated positions of the rescuing devices. Also, a combination of a number of ToA calculations and GNSS positions of a same single rescuer carrying a rescuing device performed at three different locations will yield the same result, since the person to be rescued is assumed not to be moving, provided however the fixes done at a definite position are identified as measurement fixes.

All measurements and transmissions can be triggered automatically, at least in the rescued mode.

The three types of solutions may be combined together through data fusion performed either by one or more of the rescuing devices or by one or more of the devices to be recovered. Data fusion may also be performed at a master station of the rescuers, located either in the search area or at a remote location.

GNSS receivers routinely can achieve an instant precision better than 10 m. Through integration over time, they may achieve a precision better than 1 m. As a variant applicable to all types of solutions mentioned hereinabove, one of the rescuing devices 120a, for instant carried by the guide of a team of skiers or the leader of a team of post-earthquake rescuers, may be able to calculate a Precise Point Position by acquiring correction data (i.e. ionospheric corrections, orbital corrections, satellite biases, etc . . . ) from a specific satellite or internet service (Inmarsat, Eutelsat, RTK, etc . . . ) as well as Satellite-based augmentation system (SBAS). Then the other rescuing devices 120a will be able to position themselves precisely relative to the PPP positioned receiver, using ToA/AoA/SS measurements and calculations. And the device(s) to be recovered 110a will also be able to benefit from the PPP precision which can be better than 10 cm.

A variant of the recovery assistance device of FIG. 1a is represented on FIG. 1b. On this figure, the recovery assistance device of the invention 110b comprises, in addition to the same components as device 110a, a battery add-on 115b, a modem add-on 116b and a protection 117b. The battery add-on 115b may be a standard accessory for smart phones. In the context of the invention, it may also be a ruggedized battery add-on with increased capacity. The modem add-on 116b is used to drive the CW SPU 111a to generate the carrier modulated waveform to perform TOA/AoA/SS calculations or demodulate carrier received from other recovery assistance devices. A protection 117b may be used to preserve the recovery assistance device from chocks and low temperature.

Another variant of the recovery assistance devices of FIGS. 1a and 1b is represented on FIG. 1c. This device 110c comprises a sonar transducer and SPU add-on 118c and a sonar transducer/antenna 119c. Also, a protection 117c is provided to make sure that the recovery assistance device of this embodiment is waterproof, at least down to a certain depth in water. The sonar transducer SPU add-on will also include a modem to modulate and demodulate the sonar CW transmitted or received. The sonar wave will be used in-lieu of an RF carrier wave. The use case scenario is to equip sailors, fishers or any type of boat crews. RF and sonar CW may, in some embodiments be used in combination. For instance, sonar could be used on a snowmobile vehicle.

As an option, which may be added to all variants of the recovery assistance device of the invention, life parameters (heart beats, temperature, etc . . . ) may be acquired by sensors and transmitted to the rescuing devices through the carrier wave link. A drop of temperature of the body measured by such sensor or a sudden increase of the heartbeats and/or a detection of a lack of movement by an accelerometer detection of a state which requires rescuing. Such conditions may also trigger beacons to transmit.

Indeed, distress beacons could be added to the equipment of the rescuers in some embodiments, in combination to all variants of the recovery assistance device of the invention. They could be, for instance, affixed to backpacks, skis or shoes. The beacons could start emitting upon sensor measurements (e.g. accelerometers), when, for example, an avalanche is detected. False detections could be avoided or mitigated, since search and rescue teams could also rely on other means to detect an avalanche.

In some embodiments, additional beacons may be released or dropped or ejected to increase search and rescue success rate. Beacons can be ejected on detection of a first sign of avalanche, mud slide, terrain movement or earthquake. As described previously, beacons can be automatically released. Such beacons may be inflatable or have other means to have better buoyancy over snow or terrain. Beacons may record previous and past movements to help reconstructing trajectory before, at and after point of release.

Figure 2A:
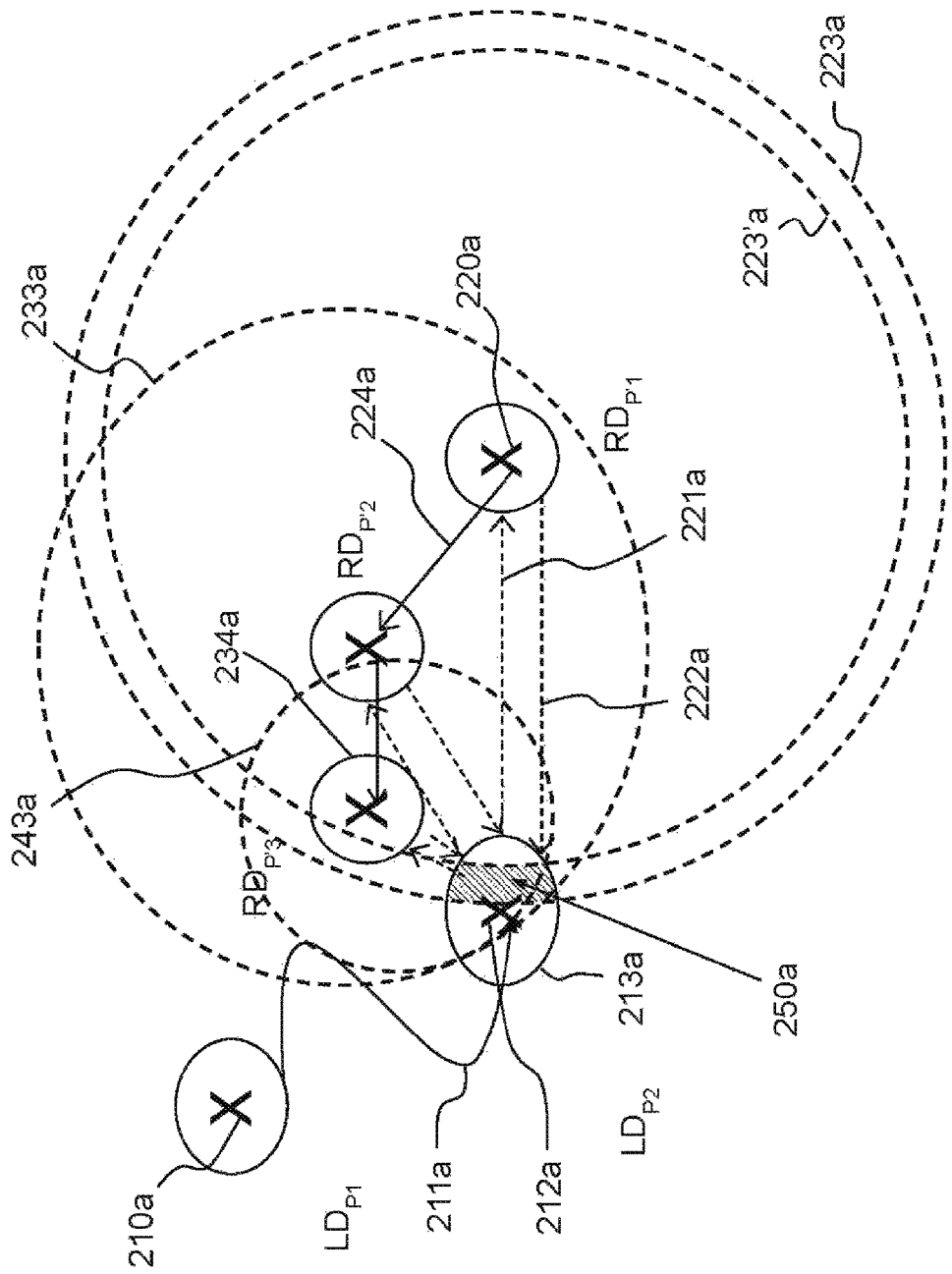

FIGS. 2a, 2b and 2c represent operational scenarios of using the recovery assistance device of the invention according to a number of its embodiments.

On FIG. 2a, a user 210a carrying a recovery assistance device, 110a, or LD (Lost Device), looses his/her position at a point $LD_{P_1}$. A position may be considered as lost either when a confidence level is lower than a minimum. A definition of confidence level in GNSS navigation may be found in PCT application PCT/EP2015/066299 filed by the same applicant. It may also be considered as lost simply when the SNR or C/NO values for all satellites fall under a predetermined level. In certain embodiments, the thresholds may be adjusted as a function of the terrain under which the LD may be expected to be found (snow, boulders) and its thickness.

In this embodiment, the PCU 114a of LD 110a comprises a plurality of motion sensors. The person carrying the device will move from position $LD_{P_1}$ to position $LD_{P_2}$ (212a) following a trajectory 211a. $LD_{P_1}$ is determined as the point where the motion detected by the motion sensors is substantially null for a period of time. The LU 113a is configured to calculate the Earth Frame of Reference coordinates of $LD_{P2}$ from the position $LD_{P1}$ and motion sensor measurements. Positions $LD_{P1}$ and $LD_{P2}$ are transmitted to the searching devices RD, 120a in a message configured by the LU, and possibly a modem, on the carrier wave. As an option, the confidence levels or SNR and/or C/NO values at $LD_{P1}$, and the confidence level of the motion sensors measurements and the LU calculations may also be included in the message. Also, as another option, the device 120a may transmit, 222a, its own GNSS position $RD_{P1}$ to the device to be rescued 110a.

A recovery assistance device RD according to the invention, 120a, is carried by a rescuer 220a located at a position $RD_{P1}$. The device 120a receives a message including the identification of the LD, the position $LD_{P1}$, and possibly confidence level information about the position. Also, the device 120a receives at its T/R 121a, 122a a carrier wave 221a emitted by the T/R 111a, 112a of the device 110a. From the ToA code carried by the carrier wave, LU 123a computes the distance between positions $LD_{P1}$ and $RD_{P1}$. The intersection between the confidence level circle 213a of the position of LD and the measurement circle 223a (possibly associated also with a confidence level materialized on the figure by the second circle 223'a, forming a confidence ring) will determine a first area of recovery, 250a. It is to be noted that the distance calculation may be corrected by taking into account pre-established corrections to be applied because of the multipath reflections which are known to occur in the media under which the victim is buried.

The confidence circles 213a, 223a, 223'a may be displayed on the display of the rescue device 120a.

If this first area of recovery is considered by the rescuer as being small enough and easy to access, the rescuer will stop there.

If this is not the case, as explained further down in the description, he/she may decide to move to a second position $RD_{P2}$. The rescuer will determine its second position so that he/she comes closer to the device to be rescued, but not following a direct line thereto. This is because, as an additional option, it may be useful to be able to triangulate the positions of the searching device from the lost device. As an empirical rule, it is possible to follow a trajectory which is 45° from the direct line and stop at a point $RD_{P2}$ located half distance between the previous position $RD_{P1}$ and previously measured distance 223a. The LU 123a may be configured to compute the new point and the trajectory 224a, and possibly to display them on the display of the device. The same procedure as when the device 120a was at position $RD_{P1}$ is then repeated. The intersection of the new measurement ring 233a (including a confidence margin, similar to the confidence margin 223a, 223'a but not represented of the figure), with the previous measurement ring 223a and the confidence circle 213a of the position of the Lost Device defines a second area of recovery. If this second area of recovery is now acceptable, the procedure may be stopped and physical search and rescue may be started. If not, the procedure may be repeated once, the rescuer moving then at position $RD_{P3}$ following a trajectory 234a and producing a measurement ring 243a. Depending on the type of accident, the decision to be taken by the rescue team to stop the determination of the area of recovery after a number of iterations may depend on time elapsed from the beginning of the accident, since time is critical to be able to rescue people buried, for instance, under snow. The time spent since the accident and the time still available to the rescuer before a time limit compatible with the type of accident has elapsed may be calculated and displayed to the rescuers.

It may be advantageous in any case to repeat the procedure at least twice (three measurements), so that three RD positions ($RD_{P1}, RD_{P2}, RD_{P3}$) can be sent to the LD, the LU of which will be able to compute a position from these three RD positions, compare it to its previously determined position $LD_{P2}$, and transmit back to the RD, a corrected position.

In another embodiment of the invention which is illustrated on FIG. 2b, there is no known position of the Lost Device from which to start from. It may be though possible to start from an area 213b in which victims are likely to be found. This may be determined by the relative position of the avalanche path and the trajectory of the skiers, especially if the rescuers were part of the same team as the victims.

Advantageously, the devices according to the invention may be configured so as to easily determine an initial area of recovery, for instance using an image of the scene taken by one of the device (or from a drone), calculating automatically an initial area of recovery, by accessing either locally stored data or a remote database, displaying a centre of said initial area to be used as initial position for the purpose of the search. This allows determination of circle 213b and its centre.

Circle 213b will probably be nevertheless much larger than circle 213a of FIG. 2a. Then, if only one rescuer is available for this zone, the same procedure as in the embodiment of FIG. 2a may be applied, with the caveats that:

Only the distance determined by the RD 120a will be available, possibly together with a measurement uncertainty, 223b, the direction being undetermined or quite imprecise;

For determining the new point of the second measurement, it will be necessary to use SS to decide if the movement performed by the rescuer was adequate; a number of trials and errors may be necessary;

it will be necessary to repeat the process at least twice, so that the LD can calculate its position from the three successive positions of the RD transmitted to it and the relative distances calculated by the LU of the LD from the signals acquired by its T/R 111a, 112a.

The area of recovery 250b may be also determined directly as the intersection of areas 223b, 233b, 243b and 213b. A matching algorithm may be implemented to adjust this area of recovery with the confidence circle of the position of the LD determined by the LU of this device.

Alternatively, three different devices RD1, RD2, RD3, held by three different rescuers 220b, 230b, 240b may be positioned at three different positions, calculated as above. The procedure to be applied is then the same, except that the determination of the positions of the rescuers has to be made instantaneously by confronting in one of the LUs of the RDs the SS of the three signals.

In another embodiment of the invention illustrated on FIG. 2c, the recovery assistance device 120a is capable of measuring an AoA of the carrier wave signal emitted by the LD device to be recovered, 110a. The position of the LD carried by the person to be rescued 210c is a priori unknown. The device 120a carried by a rescuer 220c can acquire both ToA and AoA. Then, without knowing an a priori position of the LD, it is possible to determine an area of recovery 250c which is quite limited, with only one point of measurement.

Of course, if the area of recovery is still too large, it is possible to combine this embodiment with the embodiments of FIG. 2b, i.e. having one single rescuer taking successive measurements at three different locations, or having three different rescuers taking measurements, more or less simultaneous, and sending them to the device to be recovered.

Figure 3:
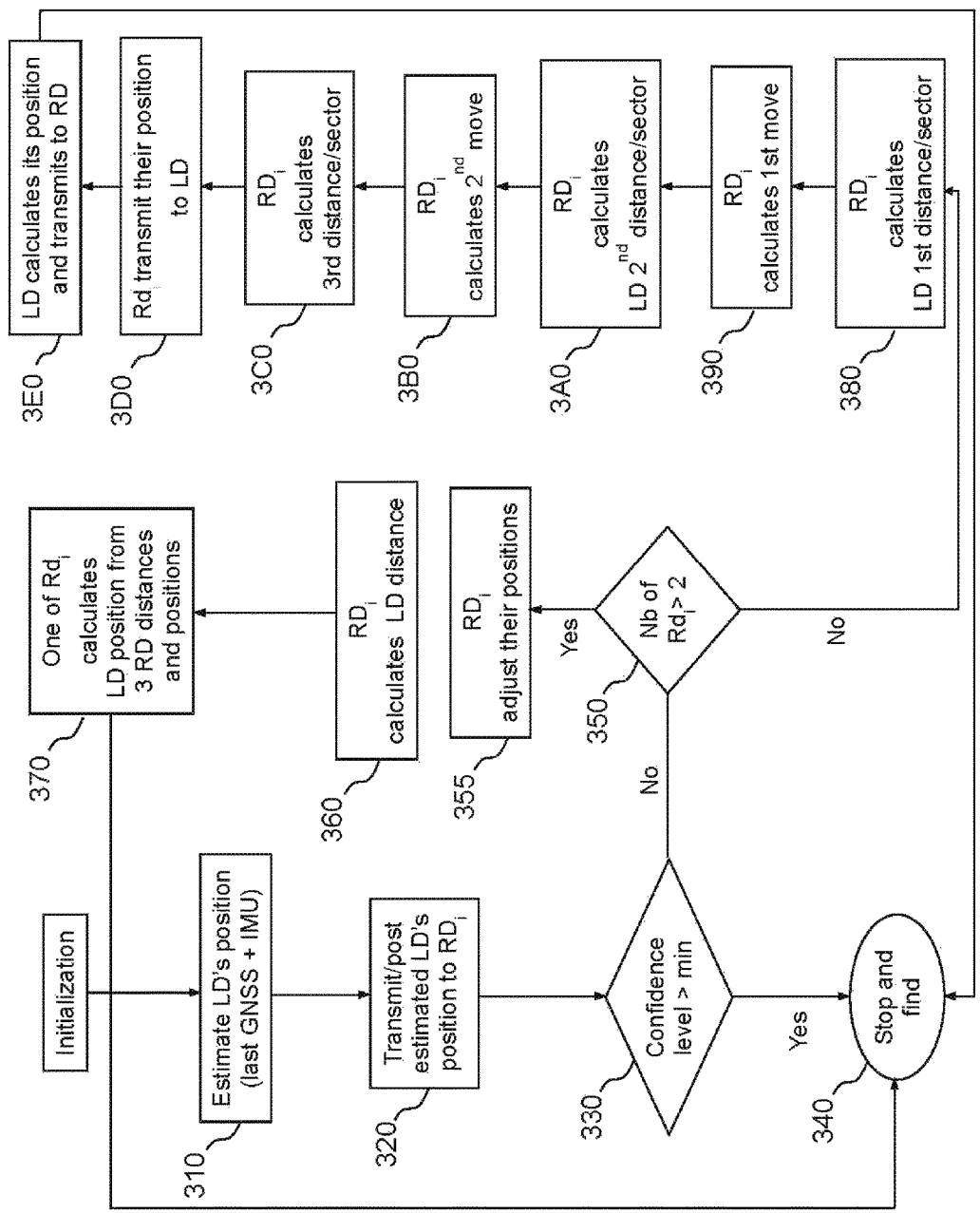
FIG. 3 displays a flow chart of the method used to implement the invention, in a number of its embodiments.

FIG. 3 displays a flow chart of the method used to implement the invention, in a number of its embodiments.

The flow chart of FIG. 3 includes all substantive steps of the method and some of the steps which are displayed on the figure may be omitted in certain circumstances.

At a step 310, a position of the Lost Device to be recovered is estimated. Estimation may be based on a position known from a last quality position of the device/user, using as discussed in conjunction with the illustration of FIG. 2a. This estimation is based on a propagation of this last quality position using measurements from motion sensors integrated in the recovery assistance device 110a. It may also be estimated from the circumstances of the accident and the terrain. A confidence level is associated with the estimation.

At a step 320, this position is broadcast to the rescuing devices 120a, or posted/published on an HTML page of the LD.

A distance between the LD and at least a RD is calculated from ToA measurements. If the result of the calculation is deemed to be consistent with the estimated position of the LD, at step 330, the electronic part of the recovery procedure may be ended at a step 340, and human search and recovery may start.

If not, the number of rescuers available in the recovery area, as measured by the ToA, is tested at step 350. If this number is higher than two (3 minimum), a step 355 of determining the best positions of the rescuers is performed. This step involves empirical rules of the type described in relation to FIG. 2a. Then, distances to the LD are calculated from these best positions (step 360) and a position of the LD is calculated from the best positions (step 370).

One will note that, if AoA is available at one of the RDs, it is possible to use less than 3 RDs, possibly only one.

If the number of RDs available in the zone delimited for searching LD equals two or is lower, it may be necessary to perform a number of moves with the available RDs, especially if none has an AoA calculation capability.

The RDs will then calculate moves at steps 390, 3B0, and distances to the LD at steps 380, 3A0 and 3C0.

Then the RDs will transmit their positions to the LD at step 3D0, and the LD will calculate its own position and retransmit it to the RDs at step 3E0.

As a variant explained above in relation to FIG. 2a, the calculations and transmissions may be done in the other direction (calculation of relative distances to RDs by LD and transmission to RDs).

It may be beneficial to define an architecture wherein one of the RDs is master and the others are slaves. One of the RDs may also have higher computing capabilities than the others and access to remote databases comprising external data which may be useful to determine likely initial search areas, rescue strategies and tactics. This access may use a cellular or satellite communication link. This master RD, with access to remote data, may also include a GNSS receiver with an access to PPP or RTK capabilities, to improve the precision of the localization of the LDs.

In case the zone to be searched is large and the number of lost victims is high, it will be also necessary to subdivide the zone to be searched into sub-zones and the team of available rescuers into sub-teams. In this case, it may be necessary to perform a preliminary step of identification of the LDs to be recovered in the various sub-zones, so that the LDs/RDs local area network may be configured efficiently.

The examples disclosed in this specification are only illustrative of some embodiments of the invention. They do not in any manner limit the scope of said invention which is defined by the appended claims.

The invention claimed is:

1. A recovery assistance device comprising:
a signal processing unit of a type defined to perform one or more of transmit or receive a carrier signal of a waveform and a frequency band selected to allow measurement of propagation distances to other signal processing units of the type through a material in a non-gaseous state; and
a logical unit configured to combine a first propagation distance between the signal processing unit and a first another signal processing unit with a position of one of the signal processing unit or the first another signal processing unit to determine a first area of recovery of one of the signal processing unit or the first another signal processing unit,
wherein the logical unit is further configured to calculate a position of said recovery assistance device from one or more combinations of an absolute position of another recovery assistance device and a distance between said recovery assistance device and said another recovery assistance device,
wherein the logical unit is further configured to determine a second area of recovery of one of the signal processing unit or the first another signal processing unit from a combination of one of a second position of the first another processing signal unit or a position of a second another signal processing unit, and a second propagation distance between said one of the signal processing unit or the second position of the first another processing signal unit or the position of the second another signal processing unit,
wherein the logical unit is further configured to combine the first area of recovery and the second area of recovery to determine points of likely recovery of the one of the signal processing unit or the first another signal processing unit at intersections of the first area of recovery and the second area of recovery, and
wherein the logical unit is further configured to disambiguate the points of likely recovery by having the one of the signal processing unit or the first another signal processing unit, and the second another signal processing unit being caused to locate themselves at predefined locations.

2. The recovery assistance device of claim 1, wherein the logical unit receives the position of the one of the signal processing unit or the first another signal processing unit from one of a position calculation unit which is co-localized with said one of the signal processing unit or another position calculation unit which is co-localized with the first another signal processing unit.

3. The recovery assistance device of claim 2, wherein the position calculation unit comprises a GNSS receiver.

4. The recovery assistance device of claim 3, wherein the position calculation unit further comprises motion sensors.

5. The recovery assistance device of claim 4, wherein the position calculation unit and the logical unit are configured to calculate a current position of said device from a previous position determined by the GNSS receiver at a confidence threshold and motion sensors measurements from this previous position up to the current position where motion is determined to be null.

6. The recovery assistance device of claim 2, wherein the position calculation unit is configured to determine a position of the one of the signal processing unit or the first another signal processing unit at a precision of or better than 50 cm.

7. The recovery assistance device of claim 1, wherein at least one of the signal processing unit or the first another signal processing unit is configured to determine an angle of arrival of the carrier signal.

8. The recovery assistance device of claim 1, wherein the logical unit is further configured to transmit its calculated position to one or more another recovery assistance devices.

9. The recovery assistance device of claim 1, wherein the material in a non-gaseous state comprises one or more of snow, rocks or construction materials and the signal processing unit is configured to one or more of transmit or receive one or more of WI-Fi or Bluetooth carrier signals.

10. The recovery assistance device of claim 9, wherein the signal processing unit is further configured to one or more of receive or transmit one or more of Wi-Fi or Bluetooth signals modulated by a code configured to calculate one or more of a time of arrival, an angle of arrival or a signal strength of the signals.

11. The recovery assistance device of claim 1, wherein the material in a non-gaseous state comprises water and the signal processing unit is configured to one or more of transmit or receive acoustic wave carrier signals.

12. The recovery assistance device of claim 11, further comprising an add-on sonar transducer and signal processing module.

13. The recovery assistance device of claim 1, further comprising a modem configured to one or more of modulate or demodulate the carrier signal of the waveform with a code selected to optimize measurement of one or more of time of arrival, angle of arrival and signal strength or transmission of information through the material in the non-gaseous state.

14. The recovery assistance device of claim 1, wherein the signal processing unit is further configured to be caused by the logical unit to transmit a message on the carrier signal, the message comprising one or more of an identification of said recovery assistance device or a condition of a user of said recovery assistance device gathered by a biological sensor.

15. A recovery assistance method comprising:
one or more of transmitting or receiving at a signal processing unit a type of carrier signal of a waveform and a frequency band selected to allow measurement of propagation distances to other signal processing units of the type through a material in a non-gaseous state;
combining a first propagation distance between the signal processing unit and a first another signal processing unit with a position of one of the signal processing unit or the first another signal processing unit to determine a first area of recovery of one of the signal processing unit or the first another signal processing unit;
wherein the combining comprises calculating a position of said signal processing unit from one or more combinations of an absolute position of the first another signal processing unit and a distance between said signal processing unit and said first another signal processing unit;
the recovery assistance method further comprises:
determining a second area of recovery of one of the signal processing unit or the first another signal processing unit from a combination of one of a second position of the first another processing signal unit or a position of a second another signal processing unit, and a second propagation distance between said one of the signal processing unit or said second position of the first another processing signal unit or said position of a second another signal processing unit;
combining the first area of recovery and the second area of recovery to determine points of likely recovery of the one of the signal processing unit or a first another signal processing unit at intersections of the first area of recovery and the second area of recovery; and
disambiguating the points of likely recovery by having the one of the signal processing unit or the first another signal processing unit, and the second another signal processing unit being caused to locate themselves at predefined locations.

* * * * *